(12) United States Patent
Son et al.

(10) Patent No.: US 12,365,607 B2
(45) Date of Patent: Jul. 22, 2025

(54) WATER SOFTENING SYSTEM

(71) Applicant: KYUNGDONG NAVIEN CO., LTD., Gyeonggi-do (KR)

(72) Inventors: Seung Kil Son, Seoul (KR); Soo Young Lee, Seoul (KR)

(73) Assignee: KYUNGDONG NAVIEN CO., LTD., Gyeonggi-do (KR)

( * ) Notice: Subject to any disclaimer, the term of this patent is extended or adjusted under 35 U.S.C. 154(b) by 847 days.

(21) Appl. No.: 17/486,895

(22) Filed: Sep. 27, 2021

(65) Prior Publication Data
US 2022/0098062 A1 Mar. 31, 2022

(30) Foreign Application Priority Data

Sep. 28, 2020 (KR) .................. 10-2020-0125681
Sep. 6, 2021 (KR) .................. 10-2021-0118396

(51) Int. Cl.
*C02F 1/469* (2023.01)
*C02F 1/00* (2023.01)

(52) U.S. Cl.
CPC ............ *C02F 1/4691* (2013.01); *C02F 1/008* (2013.01); *C02F 2201/005* (2013.01); *C02F 2201/46145* (2013.01); *C02F 2201/4616* (2013.01); *C02F 2209/005* (2013.01); *C02F 2209/40* (2013.01); *C02F 2301/04* (2013.01)

(58) Field of Classification Search
None
See application file for complete search history.

(56) References Cited

U.S. PATENT DOCUMENTS

2013/0213892 A1* 8/2013 Henthorne ............. B01D 61/12
  210/96.2
2014/0299551 A1* 10/2014 Xiong ................... C02F 1/4693
  210/243

FOREIGN PATENT DOCUMENTS

| KR | 100861550 B1 | 10/2008 |
| KR | 1020110040334 A | 4/2011 |
| KR | 1020200107785 A | 9/2020 |

OTHER PUBLICATIONS

Korean Patent Office, Office Action for related Application No. 10-2021-0118396 issued on Jan. 3, 2023, Korea, 5 pages.

* cited by examiner

*Primary Examiner* — Richard C Gurtowski
(74) *Attorney, Agent, or Firm* — MCDONALD HOPKINS LLC

(57) ABSTRACT

Disclosed is a water softening system includes a first and a second filter unit that selectively performs any one of a removable mode discharging soft water including less ionic material than a source water, and a recycling mode of discharging reclaimed water including more ionic material than the source water, a first and a second supply passage that supplies the source water to the first and the second filter unit, a first and a second discharge passage that discharges the soft water or the reclaimed water from the first and the second filter unit, a first recovery passage part that guides at least a portion of the reclaimed water in the first discharge passage to the second supply passage, and a second recovery passage part that guides at least a portion of the reclaimed water in the second discharge passage to the first supply passage.

10 Claims, 6 Drawing Sheets

WATER SOFTENING SYSTEM

CROSS-REFERENCE TO RELATED APPLICATION

This application claims the benefit of priority to Korean Patent Application No. 10-2020-0125681, filed in the Korean Intellectual Property Office on Sep. 28, 2020 and Korean Patent Application No. 10-2021-0118396, filed in the Korean Intellectual Property Office on Sep. 6, 2021, the entire contents of which are incorporated herein by reference.

TECHNICAL FIELD

The present disclosure relates to a water softening system.

BACKGROUND

A water softening system is a system that produces soft water from source water and supplies the produced soft water to a consumer site. For example, in a water softening system of a points of entry (PoE) type, the consumer site may be a house, and the soft water delivered to a consumer site is in turn delivered to a water faucet, a shower head, and the like that require water.

A filter that softens source water by removing an ionic material from the source water is not permanently used, and even when the filter is semi-permanently used, it may be smoothly used only when a recycling operation of discharging the collected ionic material is performed periodically.

In an electrical deionization system that deionizes source water by using an electrical force has a limit in increasing recovery rate. A recovery rate is obtained by dividing an amount of discharged soft water by an amount of introduced water, and generally reaches about 80%. When an amount of soft water is excessively increased to increase recovery rate, an ionic material is not sufficiently removed from source water and soft water of a low quality is discharged so that a water softening performance deteriorates.

SUMMARY

The present disclosure has been made to solve the above-mentioned problems occurring in the prior art while advantages achieved by the prior art are maintained intact.

An aspect of the present disclosure provides a water softening system having an improved recovery rate.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a water softening system includes a first filter unit and a second filter unit that selectively performs any one of a removable mode of removing at least a portion of an ionic material included in source water that is supplied, based on an electrical force, and discharging soft water including less ionic material than the source water, and a recycling mode of discharging the ionic material collected during the removal mode together with the supplied source water, and discharging reclaimed water including more ionic material than the source water, a first supply passage and a second supply passage that supplies the source water to the first filter unit and the second filter unit, a first discharge passage and a second discharge passage that discharges the soft water or the reclaimed water from the first filter unit and the second filter unit, a first recovery passage part that guides at least a portion of the reclaimed water in the first discharge passage to the second supply passage, and a second recovery passage part that guides at least a portion of the reclaimed water in the second discharge passage to the first supply passage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
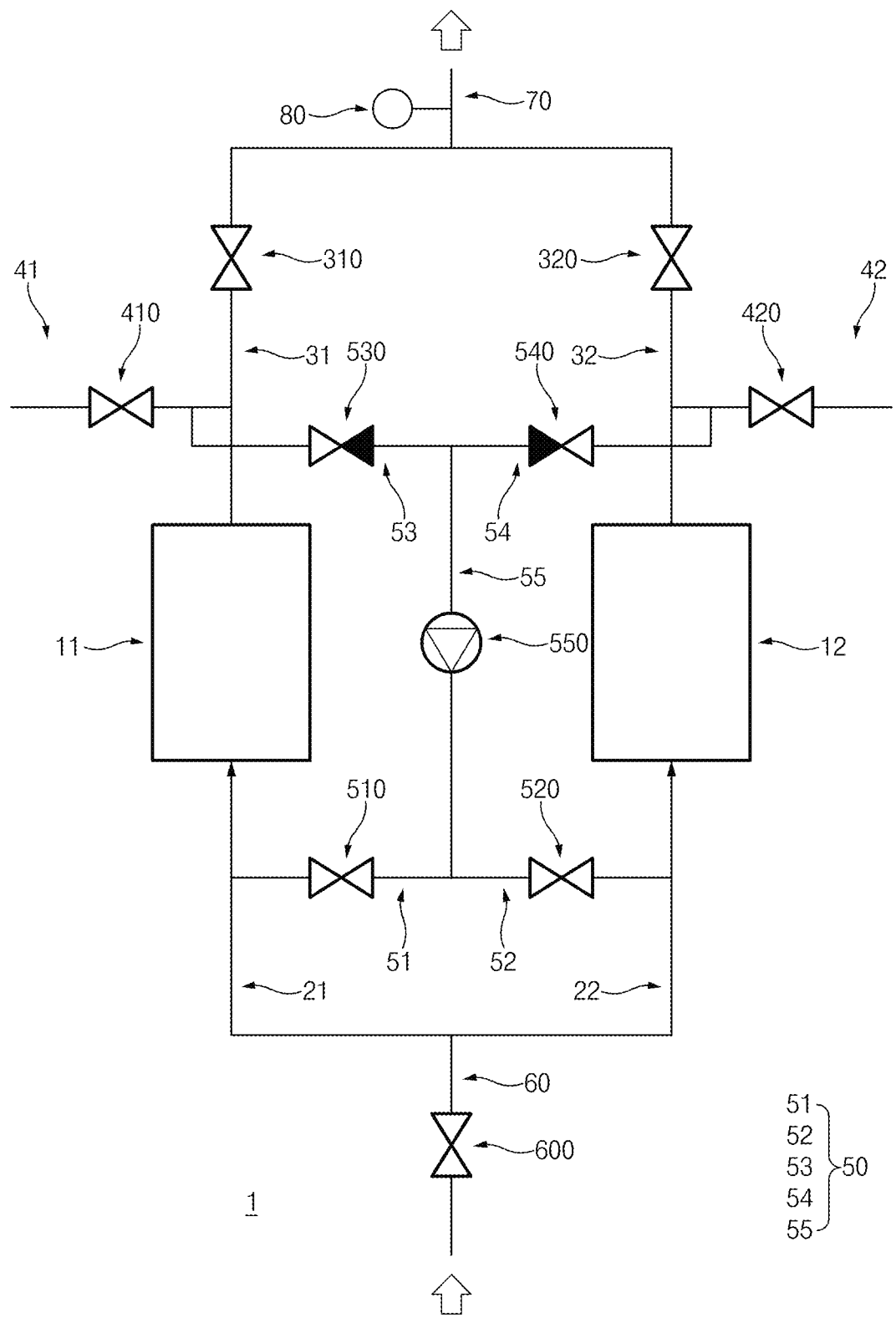
FIG. 1 is a conceptual view of a water softening system according to an embodiment of the present disclosure.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the components from other components, and the essences, sequences, orders, and the like of the components are not limited by the terms. When it is described that one element is connected, coupled, or electrically connected to another element, the element may be directly connected or coupled to the other element, but a third element may be connected, coupled, or electrically connected between the elements.

FIG. 1 is a conceptual view of a water softening system 1 according to an embodiment of the present disclosure.

Referring to the drawing, the water softening system 1 according to the embodiment of the present disclosure includes filter units 11 and 12, supply passages 21 and 22, discharge passages 31 and 32, and a recovery passage part 50. The water softening system 1 according to the embodiment of the present disclosure may further include discharge valves 310 and 320, drainage passages 41 and 42, drainage valves 410 and 420, a water source passage 60, a water source valve 600, a consumer site passage 70, a flow rate acquiring unit 80, and a processor (not illustrated).

Supply Passages 21 and 22

The supply passages 21 and 22 are passages that are configured to supply source water to the filter units 11 and 12. A plurality of supply passages 21 and 22 may be arranged in parallel. Although it is illustrated in the embodiment of the present disclosure that a total of two supply passages 21 and 22 are formed and the first supply passage 21 and the second supply passage 22 are be disposed in parallel, configurations of the supply passages 21 and 22 are not limited thereto.

The supply passages 21 and 22 connect the water source and the filter units 11 and 12. A first supply passage 21 may be connected to a first filter unit 11 and a second supply passage 22 may be connected to a second filter unit 12. Here, the meanings of "being connected" includes a case of "being directly connected" and a case of "being indirectly connected through another element". Accordingly, as illustrated, the water source and the supply passages 21 and 22 may be connected to each other in a scheme of connecting the supply passages 21 and 22 to the water source passage 60 connected to the water source and branching the supply passages 21 and 22. Interiors of the supply passages 21 and 22 may have shapes of a hollow tubular body such that the source water including at least one of water supplied from the water source and the reclaimed water is delivered to the filter units 11 and 12. A water source valve 600 may be formed in the water source passage 60 to determine opening/closing of the passage.

First and second upstream recovery passages 51 and 52 included in the recovery passage part 50, which will be described below, may be connected to the first and second supply passages 21 and 22, respectively. That is, the first supply passage 21 may be connected to the second recovery passage parts 51, 54, and 55 through the first upstream recovery passage 51, and the second supply passage 22 may be connected to the first recovery passage parts 52, 53, and 55 through the second upstream recovery passage 52.

Discharge Passages 31 and 32

The discharge passages 31 and 32 are passages that are configured to discharge the soft water or the reclaimed water from the filter units 11 and 12. Because two filter units 11 and 12 are provided, the number of the discharge passages 31 and 32 also may correspond to the number of the filter units 11 and 12 and the discharge passages 31 and 32 may be connected to the filter units 11 and 12, respectively. That is, the first discharge passage 31 may be connected to the first filter unit 11, and the second discharge passage 32 may be connected to the second filter unit 12. Although it is illustrated in the embodiment of the present disclosure that a total of two discharge passages 31 and 32 are formed and the first discharge passage 31 and the second discharge passage 32 are be disposed in parallel, configurations of the discharge passages 31 and 32 are not limited thereto.

The discharge valves 310 and 320 are constituent elements disposed in the discharge passages 31 and 32, respectively, to adjust opening/closing of the discharge passages 31 and 32, and may open or close the discharge passages 31 and 32 as opening degrees thereof are adjusted. When the discharge passages 31 and 32 are closed by the discharge valves 310 and 320, the water is not delivered to a consumer site through the closed discharge passages 31 and 32. When the discharge passages 31 and 32 are opened by the discharge valves 310 and 320, the water may be delivered to the consumer site through the opened discharge passages 31 and 32 or may be discharged or recovered through the drainage passages 41 and 42, which will be described below. The discharge passages 31 and 32 may have shapes of a hollow tubular body such that the water provided from the filter units 11 and 12 flows.

At least one of the discharge valves 310 and 320 may be controlled by the processor to be maintained in an opened state during an operation of the water softening system 1. Then, the discharge valves 310 and 320 that are maintained in the opened state may be the discharge valves 310 and 320 disposed in the discharge passages 31 and 32 connected to the filter units 11 and 12 that perform a removal mode. Accordingly, even while any one of the filter units 11 and 12 perform a recycling mode, the soft water discharged from the filter units 11 and 12 that perform the removal mode may be delivered to the consumer site.

As illustrated, the consumer site and the discharge passages 31 and 32 may be connected to each other in a scheme of connecting the discharge passages 31 and 32 to the consumer site passage 70 connected to the consumer site and merging the discharging passages 31 and 32. The flow rate acquiring unit 80, which will be described below, may be disposed in the consumer site passage 70.

Recovery Passage Part 50

The recovery passage part 50 is a constituent element for recovering and providing the reclaimed water discharged from the filter units 11 and 12 that perform the recycling mode to another filter unit 11 and 12.

The recovery passage part 50 may include the first recovery passage parts 52, 53, and 55 and the second recovery passage parts 51, 54, and 55. The first recovery passage parts 52, 53, and 55 may be disposed to guide at least a portion of the reclaimed water in the first discharge passage 31 to the second supply passage 22, and the second recovery passage parts 51, 54, and 55 may be disposed to guide at least a portion of the reclaimed water in the second discharge passage 32 to the first supply passage 21. For the respective operations, the first recovery passage parts 52, 53, and 55 may be connected to the first discharge passage 31 and the second supply passage 22, and the second recovery passage parts 51, 54, and 55 may be connected to the second discharge passage 32 and the first supply passage 21.

The first recovery passage parts 52, 53, and 55 and the second recovery passage parts 51, 54, and 55 may share a common recovery passage 55. The first recovery passage parts 52, 53, and 55 may include a first downstream recovery passage, the common recovery passage 55, and a second upstream recovery passage 52, and the second recovery passage parts 51, 54, and 55 may include a second downstream recovery passage 54, the common recovery passage 55, and a primary upstream recovery passage 51.

The first upstream recovery passage 51 and the second upstream recovery passage 52 may connect the common recovery passage 55 to the first supply passage 21 and the second supply passage 22, respectively. The first downstream recovery passage 53 and the second downstream recovery passage 54 may connect the common recovery passage 55 to the first discharge passage 31 and the second discharge passage 32, respectively. The reclaimed water introduced into the common recovery passage 55 from the discharge passage 31 and 32 through the downstream recovery passages 53 and 54, respectively, may be recovered in a scheme of delivering the reclaimed water to the supply passages 21 and 22 through the upstream recovery passages 51 and 52, respectively.

Various recovery valves may be disposed for opening and closing the recovery passage part 50. In detail, a first upstream recovery valve 510 and a second upstream recovery valve 520 may be disposed in the first upstream recovery passage 51 and the second upstream recovery passage 52, respectively. A first downstream recovery valve 530 and a second downstream recovery valve 540 may be disposed in the first downstream recovery passage 53 and the second downstream recovery passage 54, respectively.

The first downstream recovery valve 530 and the second downstream recovery valve 540 may be check valves that allow only flows from the first discharge passage 31 or the second discharge passage 32 to the common recovery passage 55. The reclaimed water may be prevented from being introduced into the filter units 11 and 12 again through outlet ends of the filter units 11 and 12 or being discharged to the consumer site through the discharge passages 31 and 32, by allowing only flows of the water from the first downstream recovery valve 530 and the second downstream recovery valve 540 to the common recovery passage 55 and, to the contrary, interrupting reverse flows of the water from the common recovery passage 55 to the discharge passages 31 and 32.

A pump 550 may be disposed in the recovery passage part 50 to pump the reclaimed water. The pump 550 may be a constant flow pump 550 that pumps the reclaimed water at a limit flow rate that is higher than a limit flow rate, at which the reclaimed water may be discharged through any one of the first and second drainage valves 410 and 420, which will be described below. A direction, in which the pump 550 pumps the water, is a direction that faces the supply passages 21 and 22 from the discharge passages 31 and 32.

Filter Units 11 and 12

The filter units 11 and 12 are constituent elements that generate the soft water by removing ionic material in the source water. The filter units 11 and 12 are provided in the supply passages 21 and 22, respectively, and may discharge the soft water including less ion material than the source water by removing at least a portion of the ionic material included in the supplied source water by an electrical force. The operational state may be referred to as the removal mode. The filter units 11 and 12 may discharge the reclaimed water including more ionic material than that source water by discharging the ionic material collected in the removal mode together with the supplied source water. The operational state may be referred to as the recycling mode. The filter units 11 and 12 may selectively perform any one of the removal mode and the recycling mode. Although it has been described that the plurality of filter units 11 and 12 are provided and the two filter units 11 and 12 of the first and second filter units 11 and 12 are disposed, the configurations thereof are not limited thereto.

The filter units 11 and 12 may remove the ionic material in an electrical deionization scheme. In more detail, the scheme of removing the ionic material includes the electrical deionization scheme. When a DC voltage is applied to charged particles in an electrolyte, positive charged particles travel to a negative electrode and negative charged particles travel to a positive electrode. This is called electrophoresis. The electrical deionization scheme refers to a scheme of removing ionic materials in water by adsorbing or moving the ionic material through electrodes or an ion exchange membrane based on a principle of an electrical force (electrophoresis).

The electrical deionization scheme includes schemes, such as electrodialysis (ED), Electro deionization (EDI), continuous electro deionization (CEDI), and capacitive deionization (CDI) A filter unit 11 and 12 in an ED scheme includes electrodes and an ion exchange membrane. Furthermore, a filter unit 11 and 12 in an EDI scheme includes electrodes, an ion exchange membrane, and an ion exchange resin. In contrast, a filter unit 11 and 12 in the CDI scheme includes neither an ion exchange membrane nor an ion exchange resin, or does not include an ion exchange resin.

The filter units 11 and 12 according to the embodiment of the present disclosure may remove the ionic material in, among the electrical deionization schemes, the capacitive deionization (CDI) scheme. The CDI scheme refers to a scheme of removing ions by using a principle of adsorbing and desorbing ions (or ionic material) to and from a surface of an electrode with an electrical force.

Figure 2:
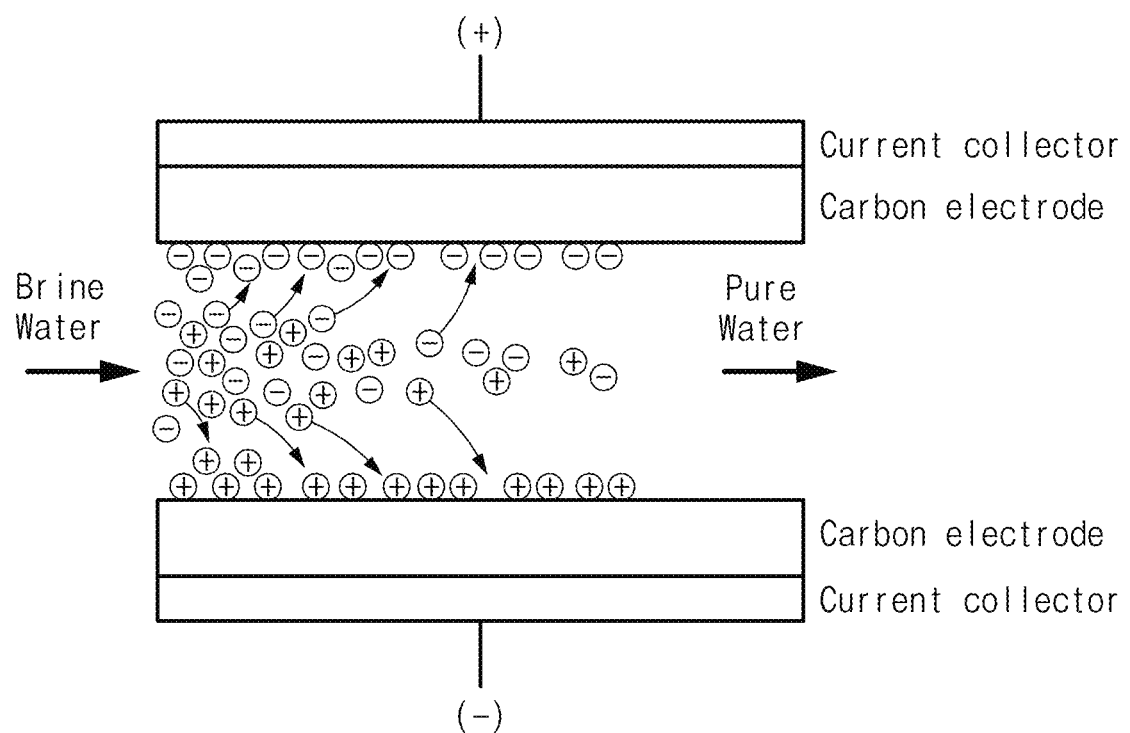
FIG. 2 is a conceptual view illustrating a principle of removing an ionic material in a CDI scheme.
Figure 3:
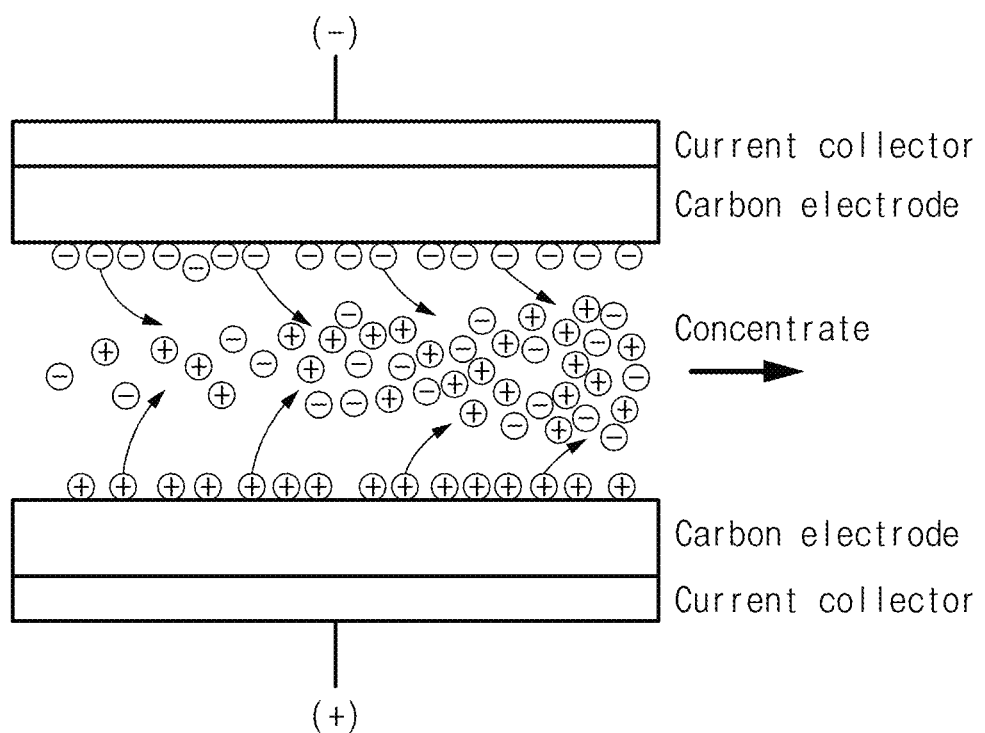
FIG. 3 is a conceptual view illustrating a principle of recycling an electrode in a CDI scheme.

FIG. 2 is a conceptual view illustrating a principle of removing an ionic material in a CDI scheme. FIG. 3 is a conceptual view illustrating a principle of recycling an electrode in a CDI scheme.

Referring to FIGS. 2 and 3, a removal mode and a recycling mode in the CDI scheme will be described. As illustrated in FIG. 2, in a state, in which a voltage is applied to electrodes, water containing ions passes between the electrodes, negative ions travel to a positive electrode and positive ions travel to a negative electrode. That is, adsorption occurs. Due to the adsorption, ions in the water may be removed. In this way, a method of, by the filter units 11 and 12, removing an ionic material in the water that passes through the filter units 11 and 12 is called the removal mode.

However, adsorption capacities of the electrodes is limited. Accordingly, adsorption continues, the electrodes reach a state, in which ions cannot be adsorbed any more. To prevent this, it is necessary to desorb the ions adsorbed to the electrode to recycle the electrodes. To achieve this, as illustrated in FIG. 3, a voltage that is opposite to a voltage applied to the electrodes in the removal mode may be applied or a voltage may not be applied. In this way, a mode of recycling the electrodes by the filter units 11 and 12 is called the recycling mode. The recycling mode may be performed before or after the removal mode.

Accordingly, for the operation, the filter units 11 and 12 may include electrodes. The filter units 11 and 12 may selectively perform any one of the removal mode of removing the ionic material in the electrical deionization scheme through the electrode, and the recycling mode of recycling the electrodes. Accordingly, when the source water is supplied to the filter units 11 and 12, the soft water may be generated by removing a portion of the ionic material in the source water and may be discharged by the filter units 11 and 12 in the removable mode, and the ionic material of the electrodes is provided to the source water and the water, of which the content of the ionic material has been increased, may be discharged by the filter units 11 and 12 in the recycling mode.

The filter units 11 and 12, as descried above, may be connected to the supply passages 21 and 22 and the drainage passages 41 and 42 to receive the water through the supply passages 21 and 22 and discharge the treated water through the drainage passages 41 and 42. The source water including at least one of the water delivered from the water source and the reclaimed water may be provided to the filter units 11 and 12, and the soft water may be generated by removing the ionic material from the provided source water and be discharged, or the reclaimed water may be generated by sending out the ionic material and be discharged.

Drainage Passages 41 and 42

The drainage passages 41 and 42 are constituent elements that are connected to the discharge passages 31 and 32 to drain the water in the water in the discharge passages 31 and 32. Accordingly, the drainage passages 41 and 42 also may have a hollow tubular shape such that the fluid flows in the discharge passages 31 and 32.

The drainage passages 41 and 42 may be disposed in the discharge passages 31 and 32, respectively. Accordingly, in the embodiment of the present disclosure, because the discharge passages 31 and 32 include the first discharge passage 31 and the second discharge passage 32, the drainage passages 41 and 42 also may include the first drainage passage 41 and the second passage 42, the first drainage passage 41 may be connected to the first discharge passage 31, and the second drainage passage 42 may be connected to the second discharge passage 32.

The water that has passed through the filter units 11 and 12 may be discharged through the drainage passages 41 and 42. In particular, when the filter units 11 and 12 are operated in the recycling mode, the reclaimed water discharged through the discharge passages 31 and 32 may be drained to the outside through the drainage passages 41 and 42 to be discarded.

However, the water is not always discharged, and whether the water is to be discharged and an amount of the discharged water may be adjusted. Accordingly, the drainage valves 410 and 420 may be provided in the drainage passages 41 and 42 for opening and closing the drainage passages 41 and 42. In the embodiment of the present disclosure, because the drainage passages 41 and 42 include the first drainage passage 41 and the second drainage passage 42, the first drainage valve 410 may be disposed in the first drainage passage 41 and the second drainage valve 420 may be disposed in the second drainage passage 42.

The drainage valves 410 and 420 may be constant flow rate valves that is configured to discharge the water at a specific flow rate.

Flow Rate Acquiring Unit 80

The flow rate acquiring unit 800 is a constituent element that acquires a flow rate of the water delivered to the consumer site, that is, a flow rate of the water used by a user. The flow rate acquiring unit 80 is configured to acquire a total flow rate of the soft water discharged through the first discharge passage 31 and the second discharge passage 32. Accordingly, the flow rate acquiring unit 80 may be disposed in the consumer site passage 70 to acquire a flow rate of the water that passes through the consumer site 70. The flow rate acquiring unit 80 may acquire the flow rate of the water delivered to the consumer site by using a Karman vortex scheme, a scheme using a Doppler effect, and the like, but the scheme of acquiring the flow rate is not limited thereto.

The flow rate acquiring unit 80 is connected to the processor, and delivers the acquired flow rate to the processor. The processor may adjust opening/closing of the valves according to the flow rate of the delivered fluid. Furthermore, the processor may control an operation of the pump 550 based on the flow rate of the delivered fluid, and also may determine operational states of the filter units 11 and 12.

Processor

The processor is a constituent element including an element that may perform logical operations for performing a control command, and may include a central processing unit (CPU). The processor may be connected to the elements, such as the filter units 11 and 12, the discharge valves 310 and 320, and the like, to transmit signals according to the control commands to the element, and may be connected to the sensors and the acquirers to receive the acquired information in a form of signals. Accordingly, in the embodiment of the present disclosure, the processor may be electrically connected to the valves, the filter units 11 and 12, the flow rate acquiring unit 80, and the pump 550 included in the water softening system 1. Because the processor may be electrically connected to the elements, it may be connected to the elements by wire or may further include a communication module that may perform communication wirelessly for mutual communications.

The water softening system 1 may further include a storage medium, and control commands performed by the processor may be stored in the storage medium to be utilized. The storage medium may be a device such as a hard disk drive (HDD), a solid state drive (SSD), a server, a volatile medium, or a nonvolatile medium, but the kinds thereof are not limited thereto. In addition, the storage medium may further store data that is necessary to allow the processor to perform an operation.

Figure 4:
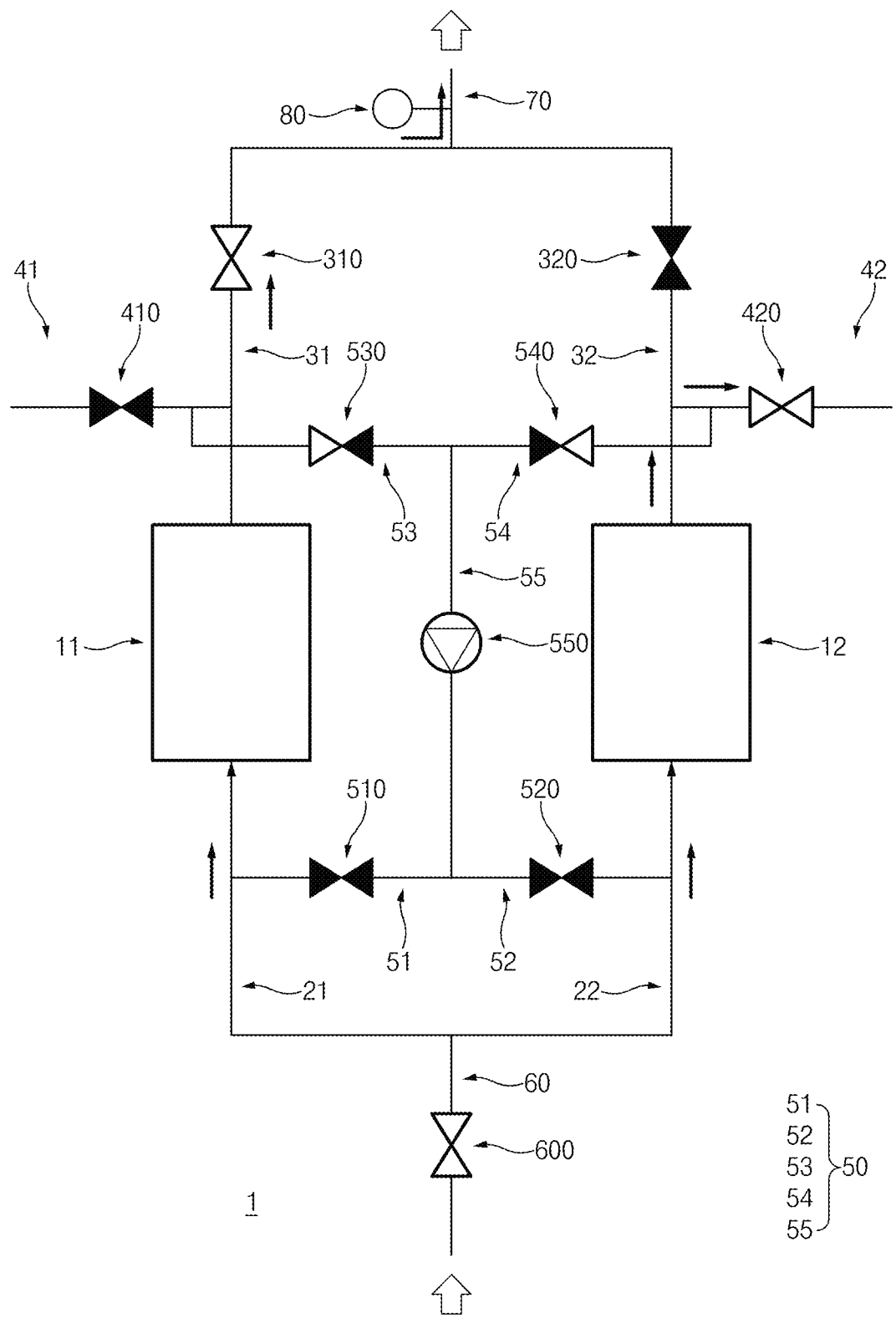
FIG. 4 is a conceptual view illustrating a situation, in which soft water is provided and reclaimed water is drained by controlling filter units of a water softening system, which are disposed in parallel, according to an embodiment of the present disclosure.
Figure 5:
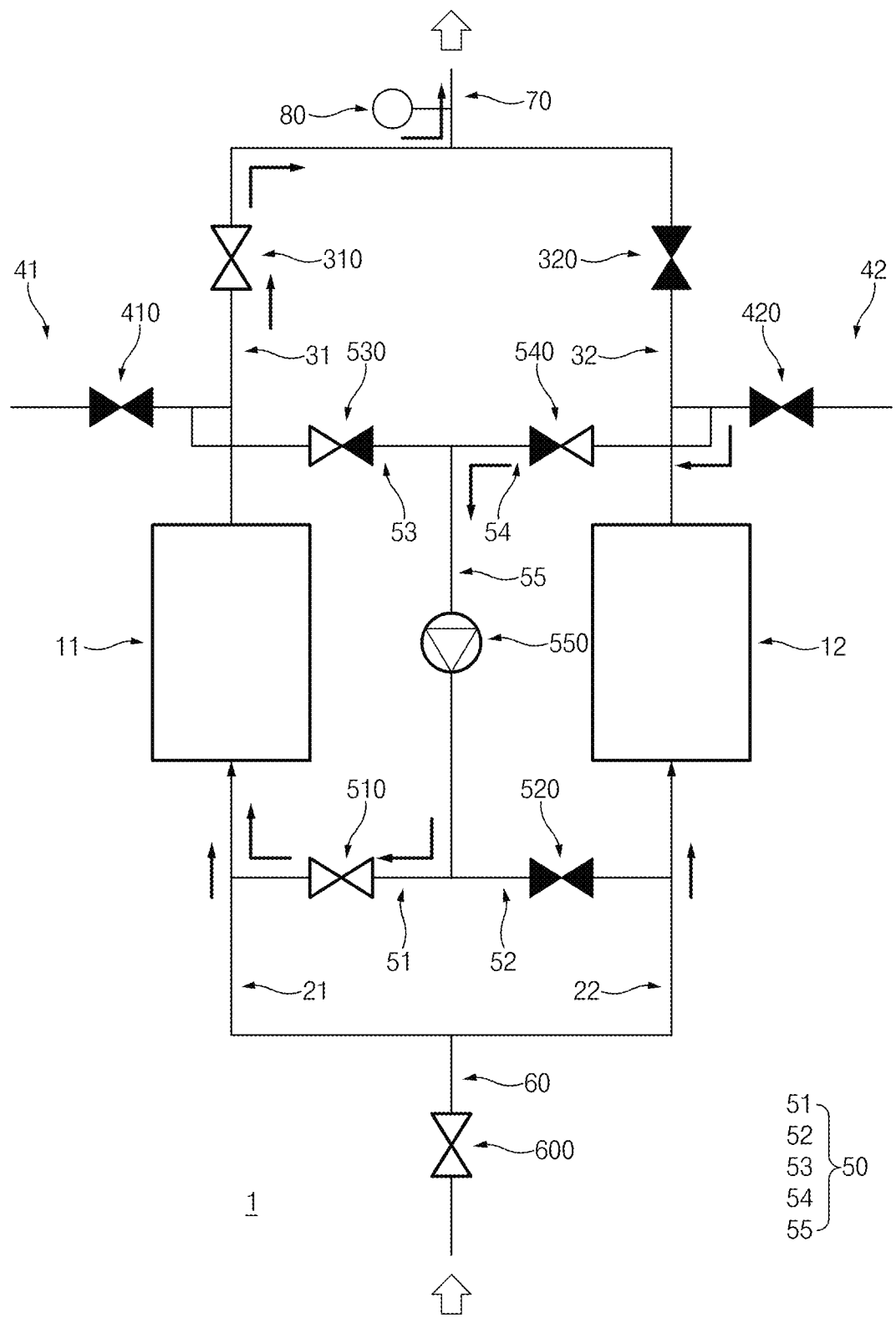
FIG. 5 is a conceptual view illustrating a situation, in which soft water is provided and reclaimed water is recovering by controlling filter units of a water softening system, which are disposed in parallel, according to an embodiment of the present disclosure.

A scheme of controlling the water softening system 1 by the processor will be described with reference to FIGS. 4 and 5. FIG. 4 is a conceptual view illustrating a situation, in which soft water is provided and reclaimed water is drained by controlling filter units 11 and 12 of the water softening system 1, which are disposed in parallel, according to an embodiment of the present disclosure. FIG. 5 is a conceptual view illustrating a situation, in which soft water is provided and reclaimed water is recovered by controlling filter units 11 and 12 of the water softening system 1, which are disposed in parallel, according to an embodiment of the present disclosure.

A description will be made with the assumption that the first filter unit 11 performs the removal mode and the second filter unit 12 performs the recycling mode. However, the assumption is only for convenience of description, and the filter units 11 and 12 may be operated in a scheme of performing the recycling mode by the first filter unit 11 when the second filter unit 12 performs the removal mode, and then, the water softening system 1 may be operated such that the modes are exchanged to correspond to the flows of the water and the operational states of the valves.

The processor, as in FIG. 5, may control such that at least a portion of the reclaimed water discharged from the second filter unit 12 through the second discharge passage 32 is supplied to the first supply passage 21 through the second recovery passage parts 51, 54, and 55. The soft water discharged from the first filter unit 11 may be discharged to the consumer site through the first discharge passage 31, and the reclaimed water discharged from the second filter unit 12 through the second discharge passage 32 may be delivered to the first filter unit 11 together with the water provided from the water source through the second recovery passage parts 51, 54, and 55 and the first supply passage 21. Accordingly, because the first filter unit 11 may receive the recovered reclaimed water together with the water provided from the water source to remove the ionic material and discharge the soft water, recovery rate may be increased.

To generates flows of water, the processor may control such that the first discharge valve 310 and the first upstream recovery valve 510 are opened and the second discharge valve 320 and the second upstream recovery valve 520 are closed. Furthermore, the processor may control such that the first drainage valve 410 and the second drainage valve 420 are closed so that the water is not drained. The second discharge valve 320 and the second upstream recovery valve 520 may be closed such that the reclaimed water is prevented from being delivered to the consumer site or being introduced into the second filter unit 12 again.

The processor may control such that the reclaimed water is drained through the second drainage passage 42, as in FIG. 4, for a specific period of time after the second filter unit 12 starts the recycling mode, and may control such that the reclaimed water is supplied to the first supply passage 21, as in FIG. 5, until the recycling mode is ended after the specific period of time.

Because a larger amount of the ionic material included in the filter unit 11 and 12 is discharged together with the water at an initial stage, in which the filter units 11 and 12 are operated in the recycling mode, a total dissolved solid (TDS) of the reclaimed water is excessively high so that a quality of the soft water may be lowered when the reclaimed water is recovered and is used when the soft water is used. Accordingly, it is necessary to drain the initially generated reclaimed water rather than to recover it.

However, after a specific period of time after the filter units 11 and 12 start to be operated in the recycling mode, the TDS of the reclaimed water is sufficiently lowered, and thus it will be good even though the reclaimed water is recovered and is used when the soft water is used. Accordingly, the discharge of the water is stopped after the specific period of time, and is recovered to increase recovery rate.

The specific period time may be a period of time from a time point, at which the recycling mode is executed, to a time point, at which the TDS of the reclaimed water becomes less than three times of the TDS of the water provided from the water source. Furthermore, the water softening system 1 of the present disclosure may further include a TDS acquiring unit (not illustrated) that may acquire TDSs of the discharge passages 31 and 32 and is further electrically connected to the processor, and the processor may control the valves such that the water is discharged when the acquired TDS is not less than three times of the TDS of the water provided from the water source and is recovered when the acquired TDS is less than three times of the TDS of the water.

To generate the flows of the water, the processor may control such that the first discharge valve 310 and the second drainage valve 420 are opened and the first and second upstream recovery valves 510 and 520 and the first drainage valve 410 are closed so that the reclaimed water is drained for a specific period of time after the second filter unit 12 starts the recycling mode. Furthermore, the processor may control such that the first discharge valve 310 and the first upstream recovery valve 510 are opened and the second discharge valve 320, the second upstream recovery valve 520, and the first and second drainage valves 410 and 420 are closed so that the reclaimed water is supplied to the first supply passage 21 through the second recovery passage parts 51, 54, and 55 after a specific period of time after the second filter unit 12 starts the recycling mode. That is, the processor closes both of the first and second upstream recovery valves 510 and 520 and opens the second drainage valve 420 to discharge the water such that the water is not recovered in the initial stage.

The processor may control such that the pump 550 is operated when a flow rate of the soft water acquired by the flow rate acquiring nit 80 is higher than a specific threshold flow rate and is not operated when the flow rate of the soft water is not higher than the specific threshold flow rate. Here, the threshold flow rate may be higher than or the same as a limit flow rate of the pump 550 when the pump 550 is a constant flow pump 550. When the pump 550 is to pump a flow rate of the soft water, which is higher than the flow rate of the soft water to be used by the user, the water is not immediately delivered to the first filter unit 11 that performs the removal mode but the entire water provided from the water source to the supply passages 21 and 22 is delivered to the second filter unit to be delivered to the first filter unit 11 via the recovery passage part 50. The above control may be performed by the processor such that the recovered reclaimed water is mixed with the water provided from the water source at a proper ratio and is provided to the first filter unit 11 so that soft water of a good quality may be produced.

The processor may control the pump 550 such that an amount of the reclaimed water provided to the first filter unit 11 becomes 30% to 40% of an amount of the soft water discharged from the first filter unit 11.

The drainage valves 410 and 420 may be constant flow valves having specific limit flow rates, and the pump 550 may be a constant flow pump 550 that pumps the water at a flow rate that is higher than the specific flow rates. Accordingly, when the pump 550 is operated, in a general case, a flow rate of the soft water that passes through the second filter unit 12 may be higher than the flow rate of the soft water 12 that passes through the second filter unit 12, and the TDS of the reclaimed water may be lowered such that the reclaimed water is recovered. Because the TDS of the recovered reclaimed water is lowered, the quality of the soft water generated through the first filter unit 11 may be increased while the recovery rate is increased.

The processor may perform the control of the valves and the filter units 11 and 12 in an opposite way. In detail, as in FIG. 4, the reclaimed water is drained while the soft water is provided, and in an opposite way to FIG. 4, when the first filter unit 11 performs the recycling mode and the second filter unit 12 performs the removable mode, the process may control such that the second discharge valve 320 is opened and the first discharge valve 310, the first upstream recovery valve 510, and the second upstream recovery valve 520 are closed. Furthermore, the processor may control such that the first drainage valve 410 is opened and the second drainage valve 420 is closed so that the water is drained through the first drainage passage 41. As in FIG. 5, the reclaimed water is recovered, and in an opposite way to FIG. 5, when the first filter unit 11 performs the recycling mode and the second filter unit 12 performs the removable mode, the process may control such that the second discharge valve 320 and the second upstream recovery valve 520 are opened and the first discharge valve 310 and the first upstream recovery valve 510 are closed. Furthermore, the processor may control such that the first drainage valve 410 and the second drainage valve 420 are closed so that the water is not drained.

OTHER EMBODIMENTS

Figure 6:
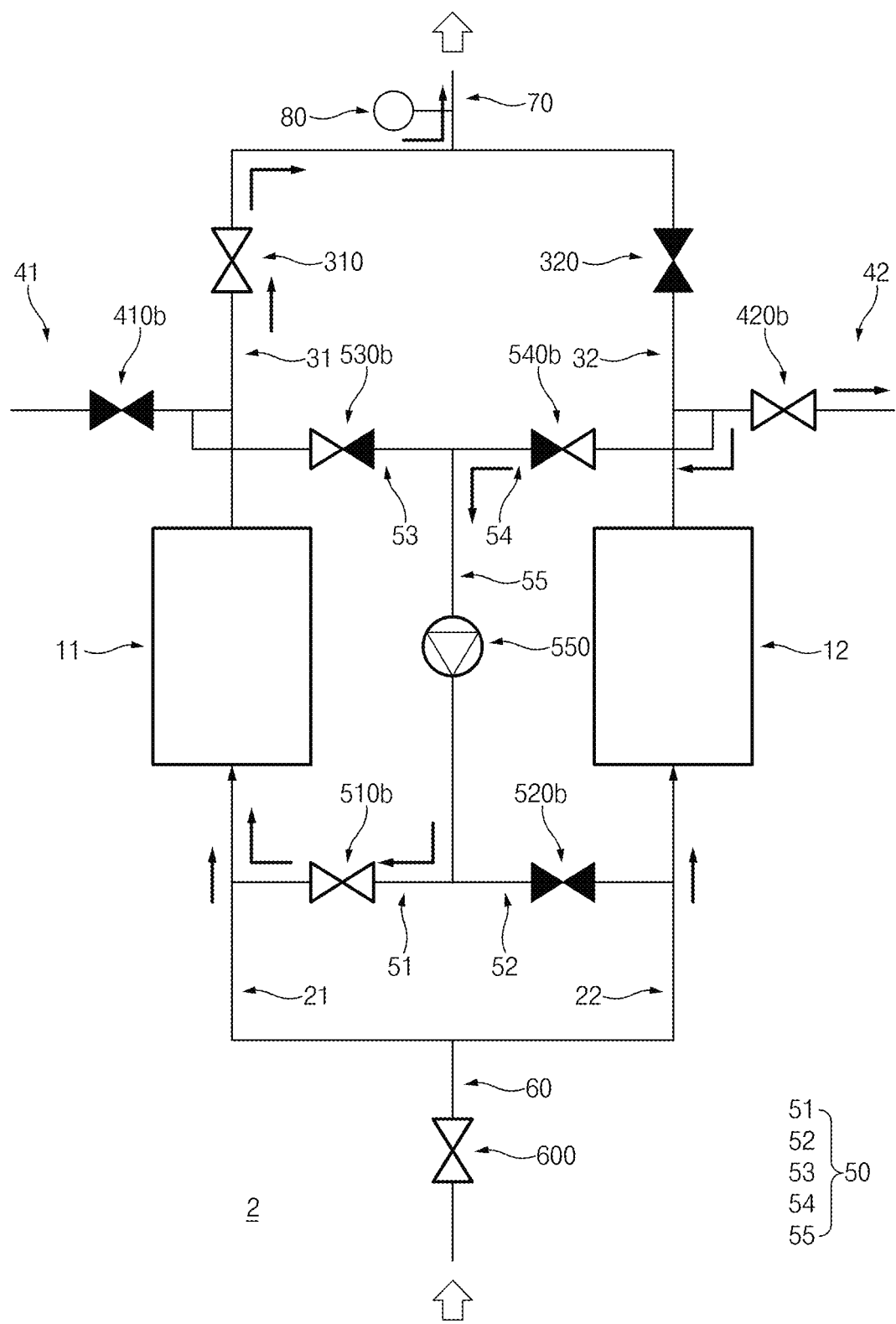
FIG. 6 is a conceptual view illustrating a situation, in which soft water is provided and reclaimed water is recovered and drained by controlling filter units of a water softening system, which are disposed in parallel, according to an embodiment of the present disclosure.

FIG. 6 is a conceptual view illustrating a situation, in which soft water is provided and reclaimed water is recovered and drained by controlling filter units 11 and 12 of the water softening system 2, which are disposed in parallel, according to another embodiment of the present disclosure. A water softening system 2 according to another embodiment of the present disclosure is partially different from the water softening system 1 according to the embodiment of the present disclosure in control through a first drainage valve 410b, a second drainage valve 420b, a first upstream recovery valve 510b, a second upstream recovery valve 520b, a first downstream recovery valve 530b, a second downstream recovery valve 540b, and a processor, and is the same in the other parts, and thus the description of the water softening system 1 according to the embodiment is applied to the water softening system 2 according to the another embodiment, except for the differences, which will be described below.

The processor, as in FIG. 6, may control such that a portion of the reclaimed water discharged from the second filter unit 12 through the second discharge passage 32 is supplied to the first supply passage 21 through the second recovery passage parts 51, 54, and 55 and the remaining portion of the reclaimed water discharged through the second discharge passage 32 is drained through the second drainage passage 42. The soft water discharged from the first filter unit 11 may be discharged to the consumer site through the first discharge passage 31, and a portion of the reclaimed water discharged from the second filter unit 12 through the second discharge passage 32 may be delivered to the first filter unit 11 together with the water provided from the water source through the second recovery passage parts 51, 54, and 55 and the first supply passage 21, and the remaining portion of the reclaimed water discharged through the second discharge passage 32 may be discarded through the drainage passage 42. That is, the reclaimed water discharged through the second discharge passage 32 is distributed to the second recovery passage parts 51, 54, and 55 and the second drainage passage 42.

To generate flows of the water, the processor may control such that at least a portion of the first upstream recovery valve 510b and the second drainage valve 420b within a range, in which they are not fully closed. Accordingly, a portion of the reclaimed water discharged through the second discharge passage 32 may pass through the first upstream recovery valve 510b and may be provided to the first filter unit 11, and the remaining portion thereof may be drained through the second drainage valve 420b. That is, the processor may adjust the flow rates of the reclaimed water discharged through the second recovery passage parts 51, 54, and 55 and the second drainage passage 42, though control of the openings of the first upstream recovery valve 510b and the second drainage valve 420b. The second discharge valve 320b and the second upstream recovery valve 520b may be controlled to be closed such that the reclaimed water is prevented from being delivered to the consumer site or being introduced into the second filter unit 12 again.

To enable the above control by the processor, at least one of the first upstream recovery valve 510b, the second upstream recovery valve 520b, the first drainage valve 410b, and the second drainage valve 420b may be a flow rate control valve, by which a flow rate may be controlled through adjusting of an opening degree thereof. A solenoid valve and the like may be used as the flow rate control valve, but the kinds thereof are not limited thereto.

Because the first downstream recovery valve 530b and the second downstream recovery valve 540b also are disposed in the recovery passage parts, the flow rate control valve may be a valve that is a check valve and, by which a flow rate may be controlled through control of an opening degree thereof. The processor may further control a flow rate of the reclaimed water recovered through control of opening degrees of the first downstream recovery valve 530b and the second downstream recovery valve 540b.

At least one of the second upstream recovery valve 520b, the first downstream recovery valve 530b, and the first drainage valve 410b may be a flow rate control valve. Through this, the water discharged through the first filter unit 11 may be distributed to the first drainage passage 41 and the first recovery passage parts 51, 54, and 55.

At least one of the first upstream recovery valve 510b, the second downstream recovery valve 540b, and the second drainage valve 420b may be a flow rate control valve. Through this, the water discharged through the second filter unit 12 may be distributed to the second drainage passage 42 and the second recovery passage parts 52, 53, and 55.

In another embodiment of the present disclosure, the processor also performs the control of the valves and the filter units 11 and 12 in an opposite way.

Accordingly, the recovery rate of the water softening system may be increased.

Although it may have been described until now that all the elements constituting the embodiments of the present disclosure are coupled to one or coupled to be operated, the present disclosure is not essentially limited to the embodiments. That is, without departing from the purpose of the present disclosure, all the elements may be selectively coupled into one or more elements to be operated. Furthermore, because the terms, such as "comprising", "including", or "having" may mean that the corresponding element may be included unless there is a specially contradictory description, it should be construed that another element is not extruded but may be further included. In addition, unless defined otherwise, all teams used herein, including technical or scientific terms, have the same meanings as those generally understood by those skilled in the art to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A water softening system comprising:
   a first filter unit and a second filter unit configured to selectively perform any one of a removable mode of removing at least a portion of an ionic material included in source water that is supplied, based on an electrical force, and discharging soft water including less ionic material than the source water, and a recycling mode of discharging the ionic material collected during the removal mode together with the supplied source water, and discharging reclaimed water including more ionic material than the source water;
a first supply passage and a second supply passage configured to supply the source water to the first filter unit and the second filter unit respectively;
a first discharge passage and a second discharge passage configured to discharge the soft water or the reclaimed water from the first filter unit and the second filter unit respectively;
a first recovery passage part configured to guide at least a portion of the reclaimed water in the first discharge passage to the second supply passage;
a second recovery passage part configured to guide at least a portion of the reclaimed water in the second discharge passage to the first supply passage; and
a processor electrically connected to the first filter unit and the second filter unit,
wherein, when the first filter unit performs the removal mode and
the second filter unit performs the recycling mode, the processor is configured to:
control such that a least a portion of the reclaimed water discharged from the second filter unit through the second discharge passage is supplied to the first supply passage through the second recovery passage part, further comprising:
a pump disposed in the second recovery passage part to pump the reclaimed water,
wherein the processor is further electrically connected to the pump.

2. The water softening system of claim 1, further comprising:
a first discharge valve and a second discharge valve disposed in the first discharge passage and the second discharge passage, respectively, for opening and closing the passages;
a first upstream recovery valve disposed in the second recovery passage part, for opening and closing the passages; and
a second upstream recovery valve disposed in the first recovery passage part, for opening and closing the passages,
wherein the processor is further electrically connected to the first discharge valve, the second discharge valve, the first upstream recovery valve, and the second upstream recovery valve, and
wherein the processor is configured to:
control such that the first discharge valve and the first upstream recovery valve are opened and the second discharge valve and the second upstream recovery valve are closed whereby the reclaimed water is supplied from the second discharge passage to the first supply passage through the second recovery passage part.

3. The water softening system of claim 2, further comprising:
a first drainage passage and a second drainage passage connected to the first discharge passage and the second discharge passage, respectively, for draining the reclaimed water; and
a first drainage valve and a second drainage valve disposed in the first drainage passage and the second drainage passage, respectively, for opening and closing the passages,
wherein the processor is further electrically connected to the first drainage valve and the second drainage valve, and wherein the processor is configured to:
control such that the first discharge valve is opened, the second discharge valve and the second upstream recovery valve are closed, and at least a portion of the first upstream recovery valve and the second drainage valve is opened whereby a portion of the reclaimed water is supplied from the second discharge passage to the first supply passage through the second recovery passage part and the remaining portion of the reclaimed water is drained from the second discharge passage through the second drainage passage.

4. The water softening system of claim 1, further comprising:
a first drainage passage and a second drainage passage connected to the first discharge passage and the second discharge passage, respectively, for draining the reclaimed water, and
wherein the processor is configured to:
control such that the reclaimed water is drained through the second drainage passage for a specific period of time after the second filter unit starts the recycling mode; and
control such that the reclaimed water is supplied to the first supply passage until the recycling mode is ended after the specific period of time.

5. The water softening system of claim 3, further comprising:
a first drainage valve and a second drainage valve disposed in the first drainage passage and the second drainage passage, respectively, for opening and closing the passages;
a first discharge valve and a second discharge valve disposed in the first discharge passage and the second discharge passage, respectively, for opening and closing the passages;
a first upstream recovery valve disposed in the second recovery passage part, for opening and closing the passages; and
a second upstream recovery valve disposed in the first recovery passage part, for opening and closing the passages,
wherein the processor is further electrically connected to the first drainage valve, the second drainage valve, the first discharge valve, the second discharge valve, the first upstream recovery valve, and the second upstream recovery valve,
wherein the processor is configured to:
control such that the first discharge valve and the second drainage valve are opened, and the first upstream recovery valve, the second upstream recovery valve, and the first drainage valve are closed whereby the reclaimed water is drained for a specific period of time after the second filter unit starts the recycling mode; and
control such that the first discharge valve and the first upstream recovery valve are opened, and the second discharge valve, the second upstream recovery valve, the first drainage valve, and the second drainage valve are closed, whereby the reclaimed water is supplied to the first supply passage through the second recovery passage part, after a specific period of time after the second filter unit starts the recycling mode.

6. The water softening system of claim 1, further comprising:
a flow rate acquiring unit configured to acquire a total flow rate of the soft water discharged through the first discharge passage and the second discharge passage, wherein the processor is further electrically connected to the flow rate acquiring unit, and wherein the processor is configured to:

control such that the pump is operated when a flow rate of the soft water acquired by the flow rate acquiring unit is higher than a specific threshold flow rate and is not operated when the flow rate of the soft water is not higher than the specific threshold flow rate.

7. The water softening system of claim 1, further comprising:
- a first drainage passage and a second drainage passage connected to the first discharge passage and the second discharge passage, respectively, for draining the reclaimed water; and
- a first drainage valve and a second drainage valve being a constant flow valves disposed in the first drainage passage and the second drainage passage, respectively, for opening and closing the passages, wherein the pump is a constant flow pump configured to pump the reclaimed water at a flow rate that is higher than a limit flow rate, at which the reclaimed water is discharged though the second drainage valve.

8. The water softening system of claim 1, wherein the processor is configured to:

control the pump such that an amount of the reclaimed water provided to the first filter unit is 30% to 40% of the soft water discharged from the first filter unit.

9. The water softening system of claim 1, wherein the first recovery passage part and the second recovery passage part share a common recovery passage, wherein the first recovery passage part includes a first downstream recovery passage connecting the common recovery passage and the first discharge passage, wherein the second recovery passage part includes a second downstream recovery passage connecting the common recovery passage and the second discharge passage, and wherein the water softening system further includes a first downstream recovery valve and a second downstream recovery valve disposed in the first downstream recovery passage and the second downstream recovery passage, respectively, to allow only a flow from the first discharge passage or the second discharge passage to the common recovery passage.

10. The water softening system of claim 1, wherein the filter unit selectively performs any one of the removal mode of removing the ionic material in an electrical deionization scheme through electrodes, and a recycling mode of recycling the electrodes.

* * * * *